United States Patent Office 2,887,483
Patented May 19, 1959

2,887,483

2,3-DIHYDRO-1,4-THIAZINE-3-ONES

George De Stevens, New Providence, N.J., assignor to Ciba Pharmaceutical Products, Inc., Summit, N.J., a corporation of New Jersey No Drawing. Application July 2, 1957
Serial No. 669,424

6 Claims. (Cl. 260—243)

This invention is related to 2,3-dihydro-1,4-thiazine-3-ones, the salts and quaternary ammonium compounds thereof. More particularly, this invention relates to 2-$R_1$-4-R-5,6-alkylene-2,3-dihydro-1,4-thiazine-3-ones of the formula:

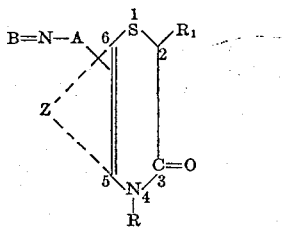

in which R and $R_1$ stand for hydrogen or an organic radical and Z for an alkylene radical containing 3 to 5 carbon atoms, and wherein A represents a direct bond between the grouping B=N— and one of the carbon atoms of the alkylene radical Z or a lower alkylene radical, and the grouping B=N— stands for a tertiary amino group, the salts and the quaternary ammonium compounds thereof, as well as process for the preparation of such compounds.

R and $R_1$, apart from being hydrogen, are especially lower hydrocarbon radicals containing from 1 to 10 carbon atoms such as, for example, lower alkyl radicals, e.g. methyl, ethyl, propyl, isopropyl, butyl, or isobutyl; lower alkenyl radicals, e.g. allyl or methallyl; lower alkinyl radicals, e.g. propargyl; cycloalkyl radicals, e.g. cyclopentyl or cyclohexyl; cycloalkyl-lower alkyl radicals, e.g. cyclopentylpropyl or cyclohexylethyl; aryl radicals, e.g. phenyl, tolyl or naphthyl; aralkyl radicals, e.g. benzyl or phenylethyl; or aralkenyl radicals, e.g. styryl. Such lower hydrocarbons may be free from functional groups, or may contain such groups, for example, nitro, amino or hydroxyl groups or halogen atoms as additional substituents. Amino groups are primarily tertiary amino groups such as, for example, dimethylamino, diethylamine, N-cyclopentyl-N-methyl-amino or N-benzyl-N-methyl-amino groups or pyrrolidino, piperidino, e.g. piperidino or 4-methyl-piperidino; morpholino, thiamorpholino or piperazino e.g. 4-methyl-piperazino or 4-hydroxyethyl-piperazino groups. Such tertiary amino groups are preferably attached to a lower alkyl, e.g. ethyl, propyl or isopropyl, radical. A free amino group may, for example, substitute an aryl, e.g. phenyl radical. Hydroxyl groups attached to lower alkyl or aryl radicals may also be etherified or esterified hydroxyl groups, e.g. methoxy or acetoxy groups. Halogen atoms, prefearbly substituting aryl radicals, are particularly chlorine or bormine atoms.

Z stands for an alkylene radical containing 3 to 5 carbon atoms, and is therefore a trimethylene, tetramethylene or pentamethylene radical, which apart from the grouping B=N—A— contains preferably no additional substituents or may have as such substituents lower alkyl radicals, e.g. methyl or ethyl; lower alkylene radicals which may form with the radical a bicyclic, a spiro or an endo ring system; aryl radicals, e.g. phenyl, which may also be fused-on to the alkylene radical, or hydroxyl groups, e.g. free, etherified or esterified hydroxyl groups.

The radical A stands for a direct bond between one carbon atom of the alkylene radical Z and the tertiary amino group B=N— or for a lower alkylene chain linking the latter with the alkylene radical Z. Such an alkylene chain contains from 1 to 7 carbon atoms and may be represented by a methylene, 1,2-ethylene, 1,2-propylene, 1,3-propylene or a 1,4-butylene radical.

The tertiary amino group B=N— stands for an N,N-di-lower hydrocarbonamino or for an N,N-lower alkylene-imino group. Lower hydrocarbon radicals are especially lower alkyl radicals, e.g. methyl, ethyl, propyl or isopropyl; lower cycloalkyl radicals, e.g. cyclopentyl or cyclohexyl; monocyclic aryl or aralkyl radicals, e.g. phenyl or benzyl. Lower alkylene radicals contain from 4 to 6 carbon atoms which may form a carbon chain or the carbon atoms may be interrupted by a heteroatom such as oxygen, sulfur or nitrogen, thus forming an oxa-, thia-, or azo-alkylene radical; together with the nitrogen of the imino group such N,N-lower-alkylene-imino groups are represented, for example, by pyrrolidino, piperidino, 2-methylpiperidino, 3-methylpiperidino, 4-methylpiperidino, hexamethyleneimino, morpholino, thiamorpholino, piperazino, 4-methyl-piperazino, 4-hydroxyethyl-piperazine or 4-acetoxy-piperazino groups.

Salts of the new compounds of this invention are particularly therapeutically useful acid addition salts such as those with inorganic acids, such as, for example, hydrohalic acids, e.g. hydrochloric or hydrobromic acid; perchloric, nitric, or thiocyanic acid; or sulfuric or phosphoric acids; or those with organic acids such as, for example, formic, acetic, propionic, glycolic, lactic, pyruvic, oxalic, malonic, succinic, maleic, fumaric, malic, tartaric, citric, hydroxymaleic, dihydroxy-maleic, benzoic, phenylacetic, p-aminobenzoic, p-hydroxybenzoic, anthranilic, cinnamic, mandelic, salicylic, p-aminosalicylic, 2-phenoxybenzoic, 2-acetoxy-benzoic, methane sulfonic, p-toluene sulfonic, napthalene sulfonic or sulfanilic acid or methionine, tryptophane, lysine or arginine.

Quaternary ammonium derivatives of the compounds of the present invention are especially those formed with lower alkyl halides, e.g. methylchloride, methylbromide, methyliodide, ethylbromide or propylchloride; or aralkyl halides, e.g. benzylchloride; or with di-lower alkyl sulfates, e.g. dimethyl- or diethyl-sulfates. The anion of such quaternary ammonium compounds may also be an anion of one of the acids outlined above, or the hydroxyl anion.

The new compounds of this invention, the salts and quaternary ammonium compounds thereof show analgesic activities and may be used as analgesic agents to alleviate pain. Especially valuable are 2,3-dihydro-1,4-thiazine-3-ones of the formula:

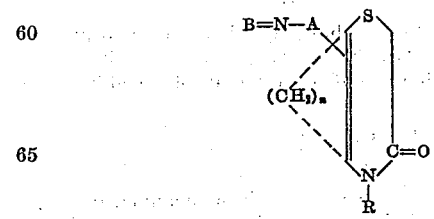

wherein A and B=N— have the above-given meaning, R stands for hydrogen, lower alkyl, e.g. methyl or ethyl, or tertiaryamino-lower alkyl, e.g. dimethylamino-ethyl, 2-dimethylamino-propyl piperidino-(N)-ethyl, and in which $n$ stands for a whole number from 3 to 5, and the acid addition salts thereof. Representative of this group are the compounds of the formula:

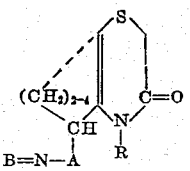

in which A and B=N— have the above-given meaning and R stands for hydrogen or methyl, such as, for example, the compound of the formula:

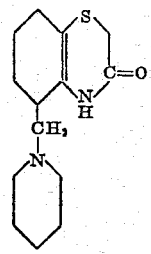

and the hydrogen halide addition salts, e.g. hydrochloride or hydrobromide, thereof.

The new compounds may be used as medicaments in the form of pharmaceutical preparations, which contain the new compounds, salts or quaternary ammonium compounds thereof in admixture with a pharmaceutical organic or inorganic solid or liquid carrier suitable for enteral or parenteral administration. For making up the preparations there can be employed substances which do not react with the new compounds, such as water, gelatine, lactose, starches, magnesium stearate, talc, vegetable oils, benzyl alcohols, gums, polyalkylene glycols, petroleum jelly or any other known carrier for medicaments. The pharmaceutical preparations may be, for example, in the form of tablets or dragees or in liquid form as solutions or emulsions. If desired, they may contain auxiliary substances such as preserving agents, stabilizing agents, salts for varying the osmotic pressure or buffers such as, for example, an alkali metal phosphate e.g. sodium metaphosphate. They may also contain, in combination, other therapeutically useful substances. The new compositions contain preferably from 0.05 mg. to about 300 mg. of the new active compounds per dosage unit. The actual dose administered in therapy depends largely on the condition of the individual patient and the desires of the practising physician.

Although several methods for the preparation of the compounds of this invention may be devised from the general chemical knowledge, a practical method, which provides the 2,3-dihydro-1,4-thiazine-3-ones of this invention in good yields, and which is intended to be included in this application, consists in treating a 2-halogeno-cycloalkanone of the formula:

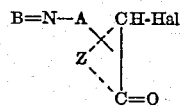

in which Z, A and B=N— have the above-given meaning and Hal represents a halogen atom, or the salts of such compounds with an amide of a thioglycolic acid having the formula:

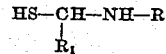

in which R and $R_1$ have the above-given meaning, or a salt thereof, and, if desired, converting any resulting 2-$R_1$-5,6-alkylene-2,3-dihydro-1,4-thiazine-3-one which is unsubstituted at the ring nitrogen atom of the 2,3-dihydro-1,4-thiazine-3-one ring into the corresponding 2-$R_1$-4-R-5,6-alkylene-2,3-dihydro-1,4-thiazine-3-one in which R stands for an organic radical, and/or, if desired, converting any resulting salt into the free base, and/or, if desired, converting any resulting free base into a salt or a quaternary ammonium compound thereof.

The halogen atom of the 2-halogenoalkanone used as the starting material in the above process has an atomic weight greater than 12 and is particularly a chlorine, bromine or iodine atom. Salts of such 2-halogeno-cycloalkanones are acid addition salts, especially those with strong mineral acids such as hydrohalic acids, e.g. hydrochloric, hydrobromic or hydriodic acid; or sulfuric acid.

Salts of the amide of a thioglycolic acid are especially the salts with alkali metals, e.g. sodium or potassium, or the ammonium salts.

The reaction is carried out in the absence or presence of a solvent, such as, for example, lower alkanols e.g. methanol, ethanol or propanol; or the mixture of such alkanols with water; or water alone; at room temperature or preferably at an elevated temperature, viz. ranging from 50 to 250° C.; at atmospheric pressure or in a closed vessel under pressure and, if desired, in the presence of an inert gas, e.g. nitrogen.

Any 2,3-dihydro-1,4-thiazine-3-one obtained according to the above precedure, in which the 4-position is unsubstituted, may be converted into the corresponding compound containing an organic radical in the 4-position. The introduction of an organic radical such as one of those described hereinbefore may be, for example, carried out by reacting an alkali metal, e.g. sodium or potassium, salt of the 2,3-dihydro-1,4-thiazine-3-one with a reactive ester formed by an unsubstituted or substituted hydroxyl-hydrocarbon radical with a strong inorganic or organic acid. Such reactive esters are primarily formed with hydrohalic acids, e.g. hydrochloric, hydrobromic or hydriodic acid; sulfuric acid or p-toluene sulfuric acid, and are represented, for example, by methylchloride, methylbromide, methyliodide, ethylchloride, propylbromide, benzylchloride, cyclopentyl-propylchloride, dimethylamino-ethylchloride, 2-dimethylamino- or 3-dimethylamino-propylchloride, piperidino-(N)-ethylchloride or others. Alkali metal salts are formed by reacting the N-unsubstituted 2,3-dihydro-1,4-thiazine-3-one with a salt forming reagent, such as, for example, sodium or potassium hydride.

To illustrate the general process, 2,3-dihydro-1,4-thiazine-3-ones of the formula:

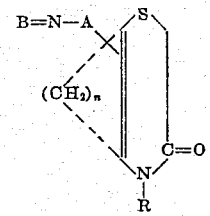

in which $n$, A and B=N— have the above-meaning and R represents hydrogen, lower alkyl e.g. methyl or ethyl; or tertiary amino-lower alkyl, e.g. dimethylamino-ethyl, 2-dimethylamino-propyl or piperidino-(N)-ethyl, may be prepared by reacting a cyclo-alkanone of the formula:

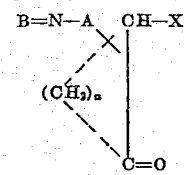

in which X stands for chlorine or bromine, or the HX— salt thereof with a thioglycolic acid amide of the formula:

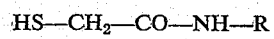

and the resulting 2,3-dihydro-1,4-thiazine-3-one which are unsubstituted in the 4-position may be converted into the corresponding 4-lower alkyl or 4-tertiaryamino-lower alkyl derivative by treatment of an alkali metal, e.g. potassium or sodium salt, obtained by refluxing the 2,3-dihydro-1,4-thiazine-3-one with an alkali metal hydride, e.g. potassium or sodium hydride, with a lower alkyl halide or a tertiary amino-lower alkyl halide. Thus, by reacting together the compounds of the formulae:

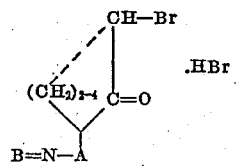

and

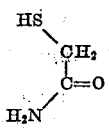

in which A and B=N— have the above-given meaning, the 1,4-thiazine-3-ones of the formula:

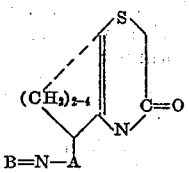

or the salts thereof may be formed, and after treatment with sodium hydride the resulting sodium salt may be reacted, for example, with methyliodide.

Depending on the conditions used the new compounds are obtained in the form of the free bases or salts thereof. The salts may be converted into the free bases in the customary way, e.g. by reaction with an alkali metal hydroxide, such as sodium or potassium hydroxide. The free bases may be transformed into their therapeutically useful acid addition salts by reaction with an appropriate inorganic or organic acid such as one of the acids outlined above, for example, in an alcoholic, e.g. methanolic or ethanolic solution.

If desired the new 2-$R_1$-4-R-5,6-alkylene-2,3-dihydro-1,4-thiazoline-3-ones of this invention which are substituted in the alkylene radical with the grouping B=N—A— having the above-given meaning, may be converted into the corresponding quaternary ammonium compounds by reaction of the tertiary bases with a lower alkyl halide, e.g. methylchloride, methylbromide, methyliodide, ethylbromide or propylchloride; an aralkylhalide e.g. benzylchloride; or a di-lower alkyl-sulfate, e.g. dimethyl- or diethyl-sulfate. The quaternizing reaction may be preformed in the presence or absence of a solvent, at room temperature or under cooling, at atmospheric pressure or in a closed vessel under pressure. Suitable solvents are more especially lower alkanols, e.g. ethanol, propanol, or butanol; or organic acid amides, e.g. formamide or dimethylformamide.

The resulting quaternary ammonium compounds may be converted into the corresponding quaternary ammonium hydroxides, for example, by reaction of the quaternary ammonium halides with silver oxide, or by reaction of the sulfates with barium hydroxide or by treating the quaternary salts with an anion exchanger or by electrodialysis. From the resulting base there may be formed quaternary ammonium salts by reaction with acids such as, for example, those outlined hereinbefore, as being suitable for the preparation of the acid addition salts, or with mono-lower alkyl sulfate, e.g. methyl or ethyl sulfate. A quaternary ammonium compound obtained may also be converted into another quaternary salt directly without conversion into the quaternary hydroxide; for example, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

The 2-halogeno-cycloalkanones of the formula:

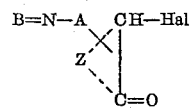

in which Z, A, B=N— and Hal have the meaning given above, or salts thereof, which are used as the starting materials for the preparation of the compounds of this invention, may be most conveniently prepared by introducing the grouping B=N—A— into the cycloalkanone ring and then halogenating the resulting substituted cycloalkanone.

Cycloalkanones which contain the grouping B=N—A— in which A stands for an alkylene radical containing at least two carbon atoms, may be prepared by reacting a tertiary aminoalkyl halide, e.g. a tertiary amino-ethylchloride, or a salt, e.g. the hydrochloride, thereof with a Grignard reagent formed, for example, by treating a halogeno-cycloalkanol, e.g. chloro- or bromo-cycloalkanol, with magnesium under conditions known for the preparation of Grignard reagents. Subsequently the tertiary amino-alkyl substituted cycloalkanol is oxidized, for example, with chromic acid, to the desired cycloalkanone.

Cycloalkanones, in which the tertiary amino group B=N— is directly attached to one of the carbon atoms of the cycloalkanone ring, may be prepared by reacting a halogenocycloalkanone with a secondary amine, or by adding a secondary alcohol to an unsaturated cycloalkanone e.g. cyclohex-2-enone.

For the preparation of cycloalkanones, in which the alkylene radical containing the tertiary amino group is attached to a carbon atom adjacent to the carbonyl group, the following specific procedures may be used: The 2-(B=N—A)-cycloalkanones in which A stands for a methylene group, may be prepared by reacting the cycloalkanone with a secondary amine of the formula B=N—H, in which the grouping B=N— has the meaning given above, in the presence of the formaldehyde according to the Mannich procedure; or, 2-(B=N—A)-cycloalkanones, in which A stands for an alkylene chain containing more than one carbon atom may be prepared, for example, by condensing the salt of a 2-carbalkoxycycloalkanone, for example, the sodium salt of a 2-carbethoxy-cycloalkanone, with a B=N-lower alkyl halide such as, for example, a lower B=N-ethylchloride, subsequently hydrolyzing the ester in an alkaline medium, e.g. aqueous sodium hydroxide, and decarboxylating the resulting acid at an elevated temperature and/or in acidic conditions.

According to the working conditions the resulting cycloalkanones may be obtained in the form of the free base or as the acid addition salt. The conversion from one form into the other may accomplished according to known methods.

The halogenation of the resulting cycloalkanones of the formula:

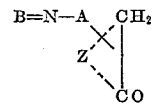

in which Z, A and B=N— have the above-given meaning, or an acid addition salt thereof, may be carried out, for example, by adding molecular halogen, e.g. chlorine or bromine, to the cycloalkanone which is preferably dissolved in an organic solvent, e.g., in glacial acetic acid which may be saturated to about 20 to 50 percent with the hydrogen halide corresponding to the halogen used, e.g. hydrogen chloride or hydrogen bromide; or by treating the cycloalkanone with a reactive N-halogeno-amide, or -imide, such as N-halogeno-acetamide e.g. N-chloroacetamide or an N-halogeno-succinimide, e.g. N-bromosuccinimide.

The resulting 2-halogeno-cycloalkanones may be obtained in the form of the free bases or as salts, e.g. hydrochloride or hydrobromide, and the conversion from one form into the other may be carried out according to known methods.

The following examples are intended to illustrate the invention. They are not to be construed as being limitations thereon. Temperatures are given in degrees centigrade.

*Example 1*

A mixture of 10 g. of 2-bromo-6-piperidino-(N)-methyl-cyclohexanone hydrobromide and 2.5 g. of thioglycolic acid amide in 75 ml. of ethanol is refluxed for one and one-half hours and then chilled. The crystalline material is filtered off and recrystallized from ethanol, yielding the 5,6-{1-[piperidino-(N)-methyl]-tetramethylene}-2,3-dihydro-1,4-thiazine-3-one hydrobromide of the formula:

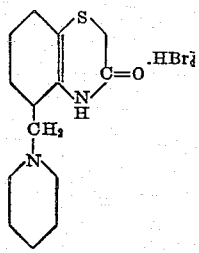

melting at 245–247°.

The free base is obtained by treating the hydrobromide with an aqueous sodium hydroxide solution, extracting the basic solution with ether and evaporating the solvent. If a solution of the base in acetone is treated with an excess of methyliodide, the methiodide of 5,6-{1-[piperidino-(N)-methyl]-tetramethylene} - 2,3 - dihydro-1,4-thiazine-3-one is obtained.

The 2-bromo-6-[piperidino - (N) - methyl]-cyclohexanone hydrobromide used as the starting material may be prepared as follows: 38.0 g. of 2-[piperidino-(N)-methyl]-cyclohexanone hydrobromide is dissolved in 100 ml. of hot glacial acetic acid and to this solution is added while stirring a solution of 23 g. of bromine in 20 ml. of glacial acetic acid. The solution is allowed to stand at room temperature overnight. Addition of ether yields a gummy material which crystallizes after several triturations with ether, and addition of acetone. 19.2 g. of the 2-bromo-6-[piperidino-(N)-methyl] - cyclohexanone hydrobromide is obtained, M.P. 129–131°.

*Example 2*

To a solution of 7 g. of 2-bromo-6-piperidino-(N)-cyclohexanone hydrobromide in 75 ml. of ethanol is added 2 g. of thioglycolic acid amide and the mixture refluxed for 2 hours. After filtering the filtrate is evaporated to dryness, the residue taken up in water and made basic with an aqueous solution of sodium hydroxide. The solution is extracted with ether, the organic layer dried over sodium sulfate and hydrogen bromide bubbled through the solution. The thus obtained hydrobromide of 5,6-{1-[piperidino-(N)]-tetramethylene}-2,3-dihydro-1,4-thiazine-3-one of the formula:

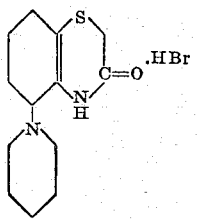

melts at 202–204°.

The 2 - bromo-6-piperidino-(N)-cyclohexanone hydrobromide used as the starting material may be prepared as follows: A mixture of 66.3 g. of 2-chloro-cyclohexanone and 85.15 g. of piperidine in 300 ml. of ethanol is refluxed for 4 hours and the ethanol is then removed. The residue is taken up into 2 N aqueous hydrochloric acid, extracted with ether and the aqueous solution made basic with a 5 percent aqueous solution of sodium hydroxide, then extracted with ether. The ether solution is dried over sodium sulfate, concentrated to about one-third of the volume and hydrogen bromide gas added; the crystalline 2-piperidino-(N)-cyclohexanone hydrobromide melts at 140–150°.

The bromination is carried out according to the procedure described in Example 1.

*Example 3*

A mixture of 4 g. of 2-bromo-6-[4-methyl-piperidino-(N)-methyl]-cyclohexanone hydrobromide and 2.5 g. of thioglycolic acid amide in 25 ml. of ethanol is refluxed for one and one-half hours and worked up as described in Example 1. The 5,6-{1-[4-methyl-piperidino-(N)-methyl]-tetramethylene}-2,3-dihydro-1,4-thiazine - 3 - one hydrobromide of the formula:

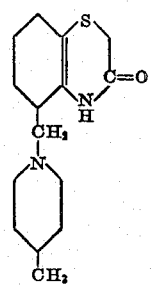

melts at 245–247°.

The 2-bromo-6-[4-methyl-piperidino-(N)-methyl] - cyclohexanone hydrobromide used as the starting material is prepared by treating 2-(4-methyl-piperidino-(N)-methyl)-cyclohexanone hydrobromide with bromine according to the procedure outlined in Example 1.

*Example 4*

A mixture of 2 g. of 2-bromo-6-[3-methyl-piperidino-(N)-methyl]-cyclohexanone hydrobromide and 2 g. of thioglycolic acide amide in 50 ml. of ethanol is refluxed for 2 hours, then let stand overnight at 5° and worked up as outlined in Example 1. The hydrobromide of 5,6-{1-[3-methyl-piperidino - (N) - methyl]-tetramethylene}-2,3-dihydro-1,4-thiazine-3-one hydrobromide of the formula:

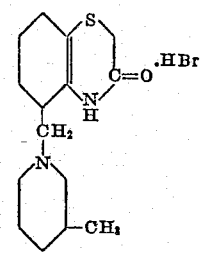

melts at 232–235°.

The 2-bromo-6-[3-methyl-piperidino-(N)-methyl] - cyclohexanone hydrobromide used as the starting material may be prepared by bromination of the 2-(3-methyl-piperidino-(N)-methyl)-cyclohexanone hydrobromide according to the procedure described in Example 1.

*Example 5*

A mixture of 2-bromo-5-[piperidino-(N)-methyl]-cyclopentanonone hydrobromide and thioglycolic acid amide in ethanol may be treated according to the procedure outlined in Example 1 and the 5,6-{1-[piperidino-(N)-methyl] - trimethylene}-2,3-dihydro-1,4-thiazine-3-one hydrobromide of the formula:

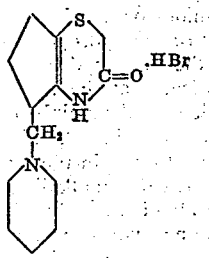

is obtained.

The 2-bromo-5-[piperidino-(N)-methyl] - cyclopentanone hydrobromide used as the starting material may be prepared as follows: To 39.4 g. of 2-[piperidino-(N)-methyl]-cyclopentanone hydrobromide, dissolved in 400 ml. of a 50 percent solution of hydrogen bromide in glacial acetic acid, is added dropwise 24 g. of bromine at 0° while stirring. After 10 minutes of additional stirring an excess of ether is added and the crystals collected and washed with ether. 47 g. of 2-bromo-5-[piperidino-(N)-methyl]-cyclopentanone hydrobromide is obtained, M.P. 132–135°.

Example 6

2-bromo-6-[pyrrolidino - (N) - methyl]-cyclohexanone hydrobromide, when treated with thioglycolic acid amide in ethanol may yield the 5,6-{1[pyrrolidino-(N)-methyl]-tetramethylene}-2,3-dihydro-1,4-thiazine-3-one hydrobromide of the formula:

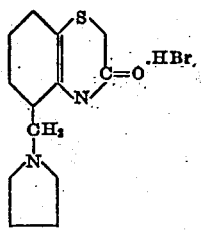

The 2-bromo-6-[pyrrolidino-(N)-methyl] - cyclohexanone hydrobromide used as the starting material may be prepared as follows: A mixture of 49 g. of cyclohexanone, 9 g. of formaldehyde and 10.8 g. of pyrrolidine hydrochloride in a round bottom flask is heated slowly until an exothermic reaction occurs. At this point heating is discontinued and the reaction is allowed to cool to room temperature overnight. 50 ml. of water is added and after extraction with ether the aqueous solution is concentrated under reduced pressure. The resulting gummy material is dissolved in acetone and after chilling 20.2 g. of 2-[pyrrolidino-(N)-methyl]-cyclohexanone hydrochloride is collected by filtration; M.P. 128–130°.

The 2-[pyrrolidino-(N)-methyl]-cyclohexanone hydrochloride is converted to the corresponding hydrobromide by dissolving in dilute sodium hydroxide, extracting with ether and adding dry hydrogen bromide to the ether solution. The hydrobromide melts at 158–160°.

To a solution of 10.2 g. of 2-[pyrrolidino-(N)-methyl]-cyclohexanone hydrobromide in 50 ml. of hot glacial acetic acid added dropwise while stirring 6.4 g. of bromine in 5 ml. of glacial acetic acid. After chilling and addition of ether a light tan precipitate is formed. 7.9 g. of 2-bromo-6-[pyrrolidino-(N)-methyl]-cyclohexanone hydrobromide is collected by filtration, M.P. 153–155°.

Example 7

A mixture of 2-bromo-6-dimethylaminomethyl-cyclohexanone hydrobromide and thioglycolic acid amide in ethanol may be treated as described in Example 1 and the 5,6- (1-dimethylaminomethyl-tetramethylene)-2,3-dihydro-1,4-thiazine-3-one hydrobromide of the formula:

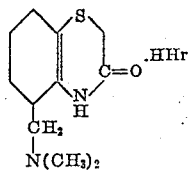

can be obtained.

The free base may be produced by treating the hydrobromide with a 5 percent aqueous solution of sodium hydroxide, extracting the aqueous solution with ether and removing the ether by distillation.

The 2-bromo-6-dimethylaminomethyl - cyclohexanone hydrobromide used as the starting material may be prepared by bromination of the 2-dimethylaminomethyl-cyclohexanone hydrobromide according to the procedure outlined in Example 1.

Example 8

By refluxing the 5,6-(1-dimethylaminomethyl-tetramethylene)-2,3-dihydro-1,4-thiazine-3-one hydrobromide (Example 7) with an excess of sodium hydride in toluene and then with an excess of methyliodide, evaporating the solvent, dissolving the residue in ether and treating the solution with hydrogen bromide gas the 4-methyl-5,6-(1-dimethylaminomethyl-tetramethylene) - 2,3 - dihydro-1,4-thiazine-3-one hydrobromide of the formula:

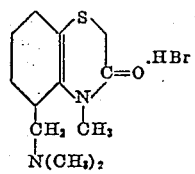

may be isolated.

Example 9

A solution of 2-bromo-7-[piperidino-(N)-methyl]-cycloheptanone hydrobromide and thioglycolic acid amide in ethanol may be refluxed and after working up according to Example 1 the 5,6-{1-[piperidino-(N)-methyl]-pentamethylene}-2,3-dihydro-1,4-thiazine - 3 - one hydrobromide of the formula:

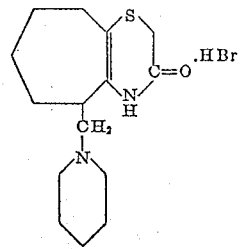

may be isolated.

The 2-bromo-7-[piperidino-(N)-methyl] - cycloheptanone hydrobromide used as the starting material may be prepared as follows: 5.4 g. of bromine is added dropwise at 0° to a solution of 9.9 g. of 2-[piperidino-(N)-methyl]-cycloheptanone in 200 ml. of a 50 percent solution of hydrogen bromide in glacial acetic acid. The solution is triturated with ether and the crude crystalline 2-bromo-7-[piperidino-(N)-methyl]-cycloheptanone hydrobromide is filtered off and used in the next step.

Example 10

Instead of the 2-bromo-6-piperidino-(N)-cyclohexanone hydrobromide the 2-bromo-5-piperidino-(N)-cyclohexanone hydrobromide may be reacted with thioglycolic acid amide according to the procedure outlined in Example 2 and the 5,6-{2-[piperidino-(N)]-tetramethylene}-2,3-dihydro-1,4-thiazine-3-one hydrobromide of the formula:

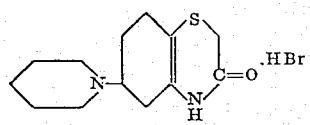

may be obtained.

The 2-bromo-5-piperidino-(N)-cyclohexanone hydrobromide used as the starting material may be prepared as follows: A mixture of 19.5 g. of piperidine and 20 g. of cyclohex-2-enone is allowed to stand overnight and then refluxed for 2 hours. After cooling the 2 N aqueous hydrochloric acid is added, the aqueous solution extracted with ether, made alkaline with a 5 percent aqueous solution of sodium hydroxide and again extracted with ether. The ether solution is concentrated and hydrogen bromide is added. The gummy material is triturated with isopropanol and after crystallization melts at 171–174°.

The bromination is carried out according to the procedure described in Example 1; the 2-bromo-5-piperidino-(N)-cyclohexanone hydrobromide melts at 157–158° (decomposition).

The process which is described in detail hereinbefore for the preparation of 2-$R_1$-4-R-5,6-alkylene-2,3-dihydro-1,4-thiazine-3-ones, in which R and $R_1$ stand for hydrogen or an organic radical, and to the alkylene radical of which is attached the grouping B=N—A— having the above-given meaning, the salts or the quaternary ammonium compounds thereof, is an especially useful example of the general process for the preparation of the compounds of this invention which consists in reacting together compounds of the formulae:

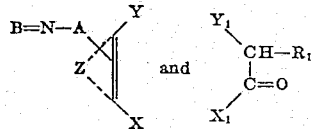

or the tautomeric forms of such compounds, wherein $R_1$, Z, A and B=N— have the previously given meaning, and in which X and $X_1$ are substituents reacting together with the formation of the group:

wherein R has the above-given meaning, and wherein Y and $Y_1$ are substituents reacting together with the formation of the group: —S—, and, if desired, converting any resulting 2-$R_1$-5,6-alkylene-2,3-dihydro-1,4-thiazine-3-one unsubstituted in the 4-position into the corresponding 2,3-dihydro-1,4-thiazine-3-one substituted in the 4-position by an organic radical and/or, if desired, converting any resulting salt into the free base, and/or, if desired, converting any resulitng free base into a salt or a quaternary ammonium compound.

X, $X_1$, Y and $Y_1$ may appropriately be selected according to general chemical knowledge from the group of substituents consisting of free or reactive esterified or etherified hydroxyl groups, free or etherified mercapto groups or free or mono-substituted amino groups. Esterified hydroxyl groups are especially hydroxyl groups esterified with strong inorganic or organic acids, such as hydrohalic or organic sulfonic acids, for example, hydrochloric, hydrobromic or p-toluene sulfonic acid. As etherified hydroxyl groups there may be mentioned especially lower alkoxy groups which may be part of a carbalkoxy group. Etherified mercapto groups are preferably lower alkyl mercapto groups. In the compounds used as starting materials hydrogen atoms being part of the substituents X, $X_1$, Y and $Y_1$ may give rise to tautomerism by shifting to neighboring atoms, thus accommodating the double bonds in the above formulae provided that the reactivity of the compounds involved for the desired purpose is not affected. The reaction is carried out in the usual manner, if necessary in the presence of condensing agents, e.g. alcoholates, amides or hydrides of alkali metals.

The replacement of the hydrogen atom attached to the nitrogen atom of the 2,3-dihydro-1,4-thiazine-3-one ring by an organic radical may be accomplished according to the procedure described hereinbefore such as, for example, treating the resulting 2,3-dihydro-1,4-thiazine-3-one derivative unsubstituted in the 4-position, or an acid addition salts thereof, with an alkali metal providing compound, such as an alkali metal hydride, e.g. sodium hydride, in a high-boiling hydrocarbon solvent, e.g. benzene or toluene, and reacting the thus formed sodium salt with an organic compound containing a reactive halogen atom such as, for example, a lower alkyl halide, e.g. methyliodide.

The compounds of this invention may also be prepared by converting in compounds of the formula:

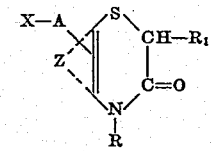

in which R, $R_1$, Z and A have the previously given meaning, and in which X stands for a radical convertible into a tertiary amino group of the formula B=N— having the above-given meaning, the radical X into such a grouping, and, if desired, converting any resulting 2-$R_1$-5,6-alkylene-2,3-dihydro-1,4-thiazine-3-one being unsubstituted in the 4-position into the desired 2,3-dihydro-1,4-thiazine-3-one substituted in the 4-position by an organic radical, and/or, if desired, converting any salt obtained into the free base, and/or, if desired, converting any free base obtained into a salt or a quaternary ammonium compound thereof.

A radical X convertible into a tertiary amino group of the formula B=N— is more especially a reactive esterified hydroxyl group. A reactive esterified hydroxyl is esterified with a strong acid, particularly a hydrohalic acid and represents especially a chlorine or a bromine atom. Such a reactive ester group may be formed by esterifying a free hydroxyl group, for example, by treatment with a thionylhalide, e.g. thionyl chloride. A 2-$R_1$-4-R-5,6-alkylene, 2,3-dihydro-1,4-thiazine-3-one containing such a grouping X—A— attached to one of the carbon atoms of the alkylene radical Z may be reacted with a secondary amine of the formula B=N—H, in which the radical B=N— has the above-given meaning. Such a reaction is preferably carried out in the presence of an acid-binding reagent such as an organic base, e.g. pyridine or collidine; and alkali metal hydroxide, e.g. sodium or potassium hydroxide; or an alkali metal or alkaline earth metal carbonate, e.g. sodium carbonate or potassium hydrogen carbonate.

My invention also comprises any modification wherein a compound obtainable as an intermediate in any step of the process of the invention is used as starting material and the remaining step(s) is (are) carried out.

The starting materials are known or can be obtained according to general methods known in the art. Advantageously such starting materials are used as lead to final products described hereinbefore as especially valuable.

What is claimed is:

1. A member of the group consisting of 2,3-dihydro-1,4-thiazine-3-ones of the formula

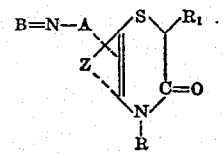

in which each of the radicals R and $R_1$ represent a member of the group consisting of hydrogen and lower alkyl, Z stands for an alkylene radical containing from 3 to 5 carbon atoms as chain members, and the group B=N—A represents a member of the group consisting of N,N-di-lower alkyl-amino, N,N-lower alkylene-imino, the alkylene radical of which contains from 4 to 6 carbon atoms, N,N-di-lower alkyl-amino-lower alkyl and N,N-lower alkylene-imino-lower alkyl, the alkylene radical of which contains from 4 to 6 carbon atoms, the therapeutically useful acid addition salts and the lower alkyl quaternary ammonium compounds thereof.

2. The 5,6-{1-[piperidino-(N)-methyl]-tetramethylene}-2,3-dihydro-1,4-thiazine-3-one.

3. The 5,6-{1-[piperidino-(N)]-tetramethylene}-2,3-dihydro-1,4-thiazine-3-one.

4. The 5,6-{1-[4-methyl-piperidino-(N)-methyl]-tetramethylene}-2,3-dihydro-1,4-thiazine-3-one.

5. The 5,6-{1-[3-methyl-piperidino-(N)-methyl]-tetramethylene}-2,3-dihydro-1,4-thiazine-3-one.

6. In a process for the preparation of a member of the group consisting of 2,3-dihydro-1,4-thiazine-3-ones of the formula

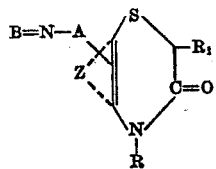

in which each of the radicals R and $R_1$ stands for a member of the group consisting of hydrogen and lower alkyl, Z stands for an alkylene radical containing from 3 to 5 carbon atoms as chain members, and the group B=N—A represents a member of the group consisting of N,N-di-lower alkyl-amino, N,N-lower alkylene-imino, the alkylene radical of which contains from 4 to 6 carbon atoms, N,N-di-lower alkyl-amino-lower alkyl and N,N-lower alkylene-imino-lower alkyl, the alkylene radical of which contains from 4 to 6 carbon atoms, the therapeutically useful acid addition salts and the lower alkyl quaternary ammonium compounds thereof, the step which comprises treating a member of the group consisting of a cycloalkanone of the formula:

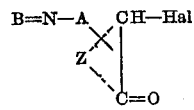

in which Z and B=N—A have the above-given meaning, and Hal stands for halogen, and acid addition salts thereof, with a member of the group consisting of a thioglycolic acid amide of the formula:

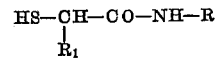

in which R and $R_1$ have the above-given meaning, and an alkali metal salt thereof.

No references cited.

UNITED STATES PATENT OFFICE
Certificate of Correction

May 19, 1959

Patent No. 2,887,483

George De Stevens

It is hereby certified that error appears in the printed specification of the above numbered patent requiring correction and that the said Letters Patent should read as corrected below.

Column 2, line 23, for "azo-alkylene" read —aza-alkylene—; column 12, line 46, after "-alkylene" strike out the comma; column 12, lines 69 to 75, claim 1, the formula should appear as shown below instead of as in the patent:

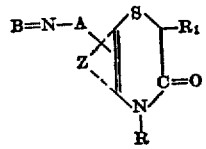

Signed and sealed this 20th day of October 1959.

[SEAL]

Attest:
KARL H. AXLINE,
Attesting Officer.

ROBERT C. WATSON,
Commissioner of Patents.